(12) United States Patent
Huber et al.

(10) Patent No.: US 9,875,200 B2
(45) Date of Patent: Jan. 23, 2018

(54) MILITARY STANDARD (MIL-STD-1760) INTERFACE BRIDGE

(71) Applicant: Raytheon Company, Waltham, MA (US)

(72) Inventors: Charles F. Huber, Waltham, MA (US); Bradley Bomar Hammel, Waltham, MA (US); Jeffrey A. Berringer, Waltham, MA (US)

(73) Assignee: Raytheon Company, Waltham, MA (US)

( * ) Notice: Subject to any disclaimer, the term of this patent is extended or adjusted under 35 U.S.C. 154(b) by 676 days.

(21) Appl. No.: 14/034,294

(22) Filed: Sep. 23, 2013

(65) Prior Publication Data
US 2015/0089099 A1 Mar. 26, 2015

(51) Int. Cl.
*G06F 13/38* (2006.01)
*G06F 13/16* (2006.01)

(52) U.S. Cl.
CPC ............ *G06F 13/387* (2013.01); *G06F 13/16* (2013.01)

(58) Field of Classification Search
USPC .......... 710/52, 105, 305, 310, 315; 370/467; 701/2, 3
See application file for complete search history.

(56) References Cited

U.S. PATENT DOCUMENTS

| | | | |
|---|---|---|---|
| 5,229,538 A | 7/1993 | McGlynn | |
| 6,122,569 A | 9/2000 | Ebert et al. | |
| 6,212,224 B1 * | 4/2001 | Cammarota et al. | ......... 375/219 |
| 6,535,522 B1 | 3/2003 | Arato et al. | |
| 6,615,116 B2 | 9/2003 | Ebert et al. | |
| 6,831,926 B1 | 12/2004 | Kinstler | |
| 6,941,850 B1 * | 9/2005 | McMahon | .............. F41G 7/007 |
| | | | 701/3 |
| 7,136,393 B2 | 11/2006 | Owens | |
| 7,453,904 B2 | 11/2008 | Seto | |
| 7,802,048 B2 | 9/2010 | Campbell | |
| 8,516,938 B2 * | 8/2013 | Roemerman et al. | ......... 89/1.54 |
| 2003/0018840 A1 | 1/2003 | Chandler | |
| 2003/0033059 A1 * | 2/2003 | Ebert et al. | ....................... 701/3 |
| 2004/0205285 A1 | 10/2004 | Kinstler | |
| 2005/0183570 A1 | 8/2005 | McMohon | |
| 2010/0070674 A1 * | 3/2010 | Campbell | ..................... 710/315 |
| 2010/0217899 A1 | 8/2010 | Sitzmann et al. | |

(Continued)

OTHER PUBLICATIONS

MIL-STD-1553 Today and Into the Future, Nov. 13, 2008, Data Device Corporation.*

(Continued)

*Primary Examiner* — Brian Misiura

(57) ABSTRACT

A military standard-1760 (MIL-STD-1760) interface bridge can include a housing, a translator device, and an energy storage device. The housing can include a MIL-STD-1760 connector on a first end and a weapon side connector on a second end. The translator device can translate a MIL-STD-1553B remote terminal (RT) protocol to a weapon side signaling protocol and translate the weapon side signaling protocol to the MIL-STD-1553B RT protocol. The energy storage device can be coupled to the operating power of the MIL-STD-1760 connector and can be configured to provide power to the translator device for a duration after the power from the MIL-STD-1760 connector is disconnected.

11 Claims, 15 Drawing Sheets

(56) References Cited

U.S. PATENT DOCUMENTS

| | | |
|---|---|---|
| 2012/0150365 A1 | 6/2012 | Maxwell et al. |
| 2013/0218372 A1 | 8/2013 | Wolfanger et al. |
| 2015/0089099 A1 | 3/2015 | Huber |

OTHER PUBLICATIONS

AN-6140, High Speed 10 Mb/sec Buses Derived from MIL-STD-1553, Holt Integrated Circuits, Inc., Aug. 2013.*

Cobham, "Small Diameter Bomb Carriage System", BRU-61/A, 2009, pp. 2, 900-071-0209, Carleton Technologies Inc, Orchard Park, New York.

DOT&E, "Joint Direct Attack Munition (JDAM)", Annual Report, 1999, 4 pages.

FAS, "AAGM-154A Joint Standoff Weapon (JSOW)", http://www.fas.org/man/dod-101/sys/smart/agm-154.htm, Jun. 2000, 3 pages.

Gregory, "Aircraft, Launcher and Weapon Interoperability Common Interfaces", North Atlantic Treaty Organization, Jan. 2007, 37 pages.

Huber et al, "Advanced UAI Integration Tools for Air to Ground Weapon Integration", SAE International, Paper No. 2012-01-2136, Oct. 2012, 3 pages.

Kopp, "Texas Instruments (Raytheon) AGM-88 HARM", Air Power International, Dec. 1998, vol. 4, No. 1, 19 pages.

Lockheed Martin, "Lockheed Martin Completes JASSM F-15E Integration with Successful All-Up Round Flight Test", Jul. 2012, 2 pages, Orlando, Florida.

Raytheon, "Paveway: Laser and GPS/Laser Precision Guided bombs", 2006, 2 pages.

U.S. Appl. No. 14/034,312, filed Sep. 23, 2013, Raytheon Company.

U.S. Appl. No. 14/034,347, filed Sep. 23, 2013, Raytheon Company.

Wikipedia, "MIL-STD-1553", http://en.wikipedia.org/wiki/MIL-STD-1553, as accessed on Mar. 4, 2016, 8 pages.

Wikipedia, "MIL-STD-1760", http://en.wikipedia.org/wiki/MIL-STD-1760, as accessed on Mar. 4, 2016, 4 pages.

Department of Defense, Interface Standard for Aircraft/Store Electrical Interconnection System, Aug. 1, 2003, 187 pages.

Wikipedia, MIL-STD-1760, Sep. 10, 2012, 3 pages.

* cited by examiner

Weapon MMSI Receptacle

| ID | Size | CS Use/Function | Socket Type | Sealing Plug |
|---|---|---|---|---|
| Y | 20 | Digital Data 1_H | M39029/56-351 | N/A |
| S | 20 | Digital Data 1_L | M39029/56-351 | N/A |
| X | 20 | Digital Data 1_S | M39029/56-351 | N/A |
| C | 20 | Digital Data 2_H[1] | M39029/56-351 | MS27488-20-1 RED |
| B | 20 | Digital Data 2_L[1] | M39029/56-351 | MS27488-20-1 RED |
| T | 20 | Digital Data 2_S[1] | M39029/56-351 | MS27488-20-1 RED |
| M | 20 | Serial Addressing_H[1] | M39029/56-351 | MS27488-20-1 RED |
| N | 20 | Serial Addressing_L[1] | M39029/56-351 | N/A |
| U | 20 | Mated Status_H | M39029/56-351 | N/A |
| V | 20 | Mated Status_L | M39029/56-351 | N/A |
| L | 20 | Safety Enable Discrete | M39029/56-351 | N/A |
| J | 20 | Safety Enable Power | M39029/56-351 | N/A |
| K | 20 | Safety Enable Power Rtn | M39029/56-351 | N/A |
| G | 20 | Operating Power | M39029/56-351 | N/A |
| F | 20 | Operating Power Return | M39029/56-351 | N/A |
| E | 20 | Aux Operating Power[2] | M39029/56-351 | MS27488-20-1 RED |
| D | 20 | Aux Operating Power Rtn[2] | M39029/56-351 | MS27488-20-1 RED |
| H | 20 | Structure Ground | M39029/56-351 | N/A |
| W | 16 | High Bandwidth[1] | M39029/56-352 | MS27488-16-1 Blue |
| Z | 16 | Spare[2] | M39029/56-352 | MS27488-16-1 Blue |
| P | 20 | Spare[2] | M39029/56-351 | MS27488-20-1 RED |
| R | 20 | Spare[2] | M39029/56-351 | MS27488-20-1 RED |
| A | 20 | Spare[2] | M39029/56-351 | MS27488-20-1 RED |

Notes:
1. The carriage system does not use this function.
2. The carriage system reserves this function for growth.

MIL-STD-1760 Interface Connector Contact/Function

| ID | Size | Carriage System Use/Function |
|---|---|---|
| A | 8 | [1] Low Bandwidth |
| B | 20 | Interlock |
| C | 16 | 28 VDC #1 |
| D | 16 | 28 VDC #1 Rtn |
| E | 16 | 28 VDC #2 Rtn |
| F | 16 | 28 VDC #2 |
| G | 20 | Address Parity |
| H | 8 | Mux Bus B |
| J | 16 | 115 VAC Phase C |
| K | 8 | Mux Bus A |
| L | 20 | Address bit A0 |
| M | 16 | 115 VAC Phase B |
| N | 16 | [2] 270 VDC return |
| P | 16 | 115 VAC Phase A |
| R | 16 | [2] 270 VDC Power |
| S | 20 | Interlock Return |
| T | 16 | Structure Ground |
| U | 16 | [2] Fiber Optics Chn 2 |
| V | 20 | Address bit A4 |
| W | 12 | [1] High Bandwidth 2 |
| X | 20 | Address bit A1 |
| Y | 16 | [2] Fiber Optics Chn 1 |
| Z | 16 | 115 VAC Neutral |
| 1 | 20 | Release Consent |
| 2 | 12 | [1] High Bandwidth 4 |
| 3 | 12 | [1] High Bandwidth 3 |
| 4 | 20 | Address bit A3 |
| 5 | 12 | [1] High Bandwidth 1 |
| 6 | 20 | Address return |
| 7 | 20 | Address bit A2 |

FIG. 4

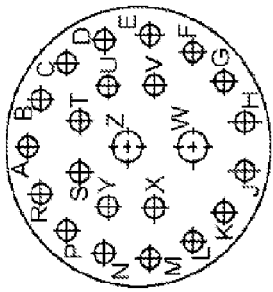

FIG. 5

MILITARY STANDARD (MIL-STD-1760) INTERFACE BRIDGE

RELATED APPLICATIONS

This application is related to and hereby incorporates by reference U.S. patent application Ser. No. 14/034,347, entitled "INTERFACE BRIDGE FOR INITIALIZING A WEAPON WITH MISSION PLANNING DATA", filed Sep. 23, 2013. This application is related to and hereby incorporates by reference U.S. patent application Ser. No. 14/034,312, entitled "TRANSLATION OF UNIVERSAL ARMAMENT INTERFACE (UAI) TO MILITARY STANDARD (MIL-STD-1760) MESSAGING INTERFACE", filed Sep. 23, 2013.

BACKGROUND

Aerial vehicles, such as attack aircraft or fighter aircraft (e.g., Boeing or McDonnell Douglas F/A-18 C/D/E/F Hornet or Lockheed Martin or General Dynamics F-16 Fighting Falcon) or unmanned aerial vehicle (UAV) (e.g., General Atomics MQ-1 Predator or MQ-9 Reaper (Predator-B)) can carry various munitions (e.g., bombs or missiles). The munitions can be carried on carriage racks (e.g., a single carriage or a dual carriage), such as a bomb release unit (BRU) (e.g., Boeing BRU-61/A). Furthermore, aerial vehicles can use a signaling protocol (e.g., military standard-1760 (MIL-STD-1760)) to control, monitor, and release the munitions on the carriage racks.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 4 illustrates a table of pin descriptions for a military standard-1760 (MIL-STD-1760) interface in accordance with an example;

FIG. 5 illustrates a table and a diagram of pin descriptions and a pin layout for a joint miniature munitions interface (JMMI) in accordance with an example;

Figure 1:
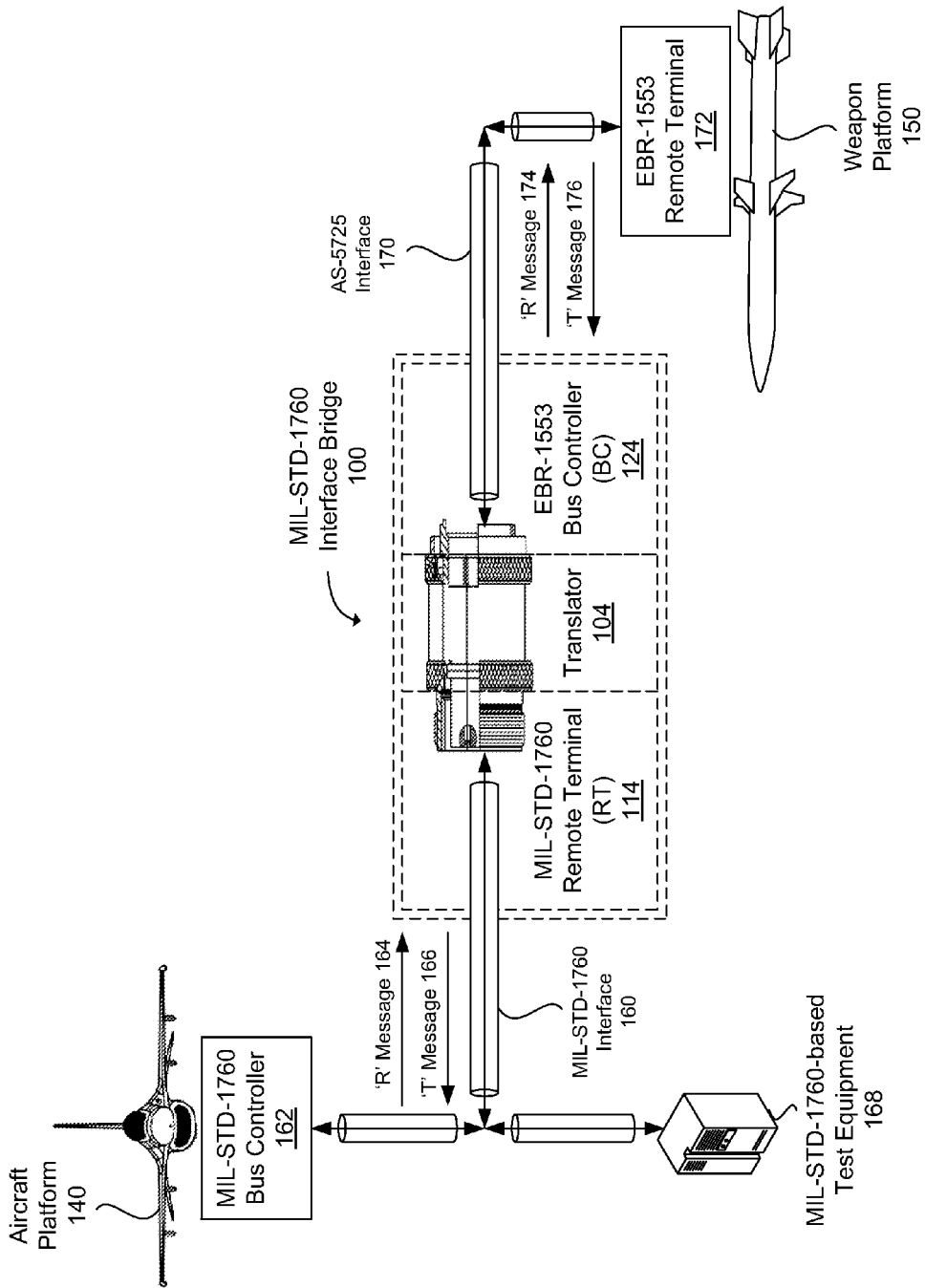
FIG. 1 illustrates a functional diagram of a military standard-1760 (MIL-STD-1760) interface bridge translation between an aircraft platform and a weapon platform in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Miniature munitions (e.g. small diameter bomb (SDB) I (SDB-I) and SDB-II) use Enhanced Bit Rate-1553 (EBR-1553) protocol, which is incompatible with a military standard-1760 (MIL-STD-1760) and/or a MIL-STD-1553B aircraft interface. These small munitions can mount to a multi-position carriage system, which can provide interface translation, and carriage and/or ejection. The disclosed MIL-STD-1760 interface bridge allows interface translation from MIL-STD-1553B to miniature munitions (MM) interfaces (e.g., joint miniature munitions interface (JMMI) and miniature munitions store interface (MMSI)) with a small, self-contained convertor connector (or plug). The MIL-STD-1760 interface bridge can eliminate a need for an expensive carriage or modifications to an aircraft platform hardware interface. Thus, the MIL-STD-1760 interface bridge can significantly reduce integration costs for miniature munitions, and allows carriage of miniature munitions on any MIL-STD-1760 platform with 14" lugs (i.e., mounts for miniature munitions).

The MIL-STD-1760 interface bridge can provide interface bus translation, including meeting timing requirements, by implementing a dual logical interface (e.g., MIL-STD-1553B/EBR-1553) translator, controlled by a programmable microcontroller in a small form factor package. The MIL-STD-1760 interface bridge can also handle translation (or pass-through) of the analog signals used for interface functionality. Power can be derived from the power provided by the aircraft platform to drive a weapon (e.g., miniature munitions). The MIL-STD-1760 interface bridge can be housed or packaged in a ruggedized connector body, which can be attached directly into the aircraft umbilical connector and provide a connector to the miniature munitions interface.

In an example, the MIL-STD-1760 interface bridge can provide: MIL-STD-1553B to EBR-1553 translation on a single device functioning as a seamless translator; microcontroller polling and/or buffering of miniature munition responses to meet MIL-STD-1553B timing requirements; direct access "shared buffers" between MIL-STD-1553B and EBR-1553 interfaces; translator power derived from miniature munitions power; and application of an energy storage device (e.g., capacitors or batteries) to maintain interface bridge functionality during power change over events occurring as part of a miniature munitions release sequence.

The following provides greater details of the examples. FIG. 1 illustrates a military standard-1760 (MIL-STD-1760) interface bridge 100 translating between an aircraft platform 140 and a weapon platform 150. The aircraft platform can include a MIL-STD-1760 bus controller (BC) 162 for sending messages (e.g., receive ('R') messages 164) to the weapon and receiving messages (e.g., transmit ('T') messages 166) from the weapon via a MIL-STD-1760 interface 160. The weapon platform can operate as an EBR-1553 remote terminal (RT) 172 for sending messages (e.g., transmit ('T') messages 176) to the aircraft and receiving messages (e.g., receive ('R') messages 174) from the aircraft and via an aircraft store-5725 (AS-5725) interface 170. The MIL-STD-1760 interface bridge can operate as a MIL-STD-1760 (e.g., MIL-STD-1553) RT 114 for the aircraft platform, include an EBR-1553 BC 124 for the weapon platform, and provide a translator 104 for providing physical layer and message layer translation between the MIL-STD-1760 interface and the AS-5725 interface. In another example, the MIL-STD-1760 RT can be coupled to MIL-STD-1760-based test equipment 168 to simulate the aircraft platform's BC and verify the translator and the MIL-STD-1760 RT functionality. In another configuration (not shown), the EBR-1553 BC can be coupled to EBR-1553-based test equipment to simulate the weapon platform's RT and verify the translator and the EBR-1553 BC functionality.

Figure 2:
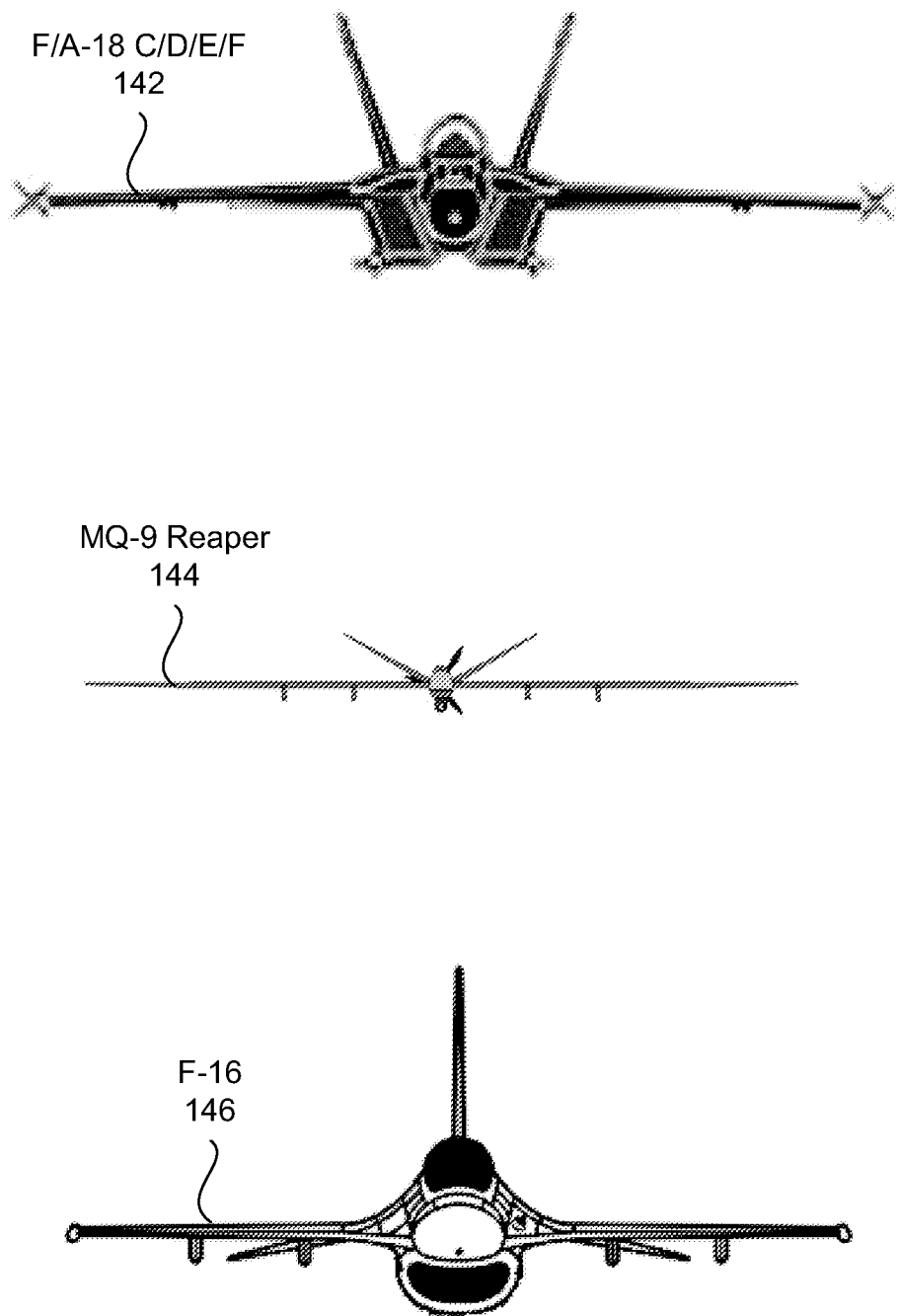
FIG. 2 illustrates a diagram of aircraft platforms in accordance with an example.

FIG. 2 illustrates example aerial vehicles, such as attack aircraft or fighter aircraft (e.g., Boeing or McDonnell Douglas F/A-18 C/D/E/F Hornet 142 or Lockheed Martin or General Dynamics F-16 Fighting Falcon 146) or unmanned aerial vehicle (UAV) (e.g., General Atomics MQ-1 Predator or MQ-9 Reaper 144 (Predator-B)) which can be aircraft platforms for the MIL-STD-1760 interface bridge.

Figure 3A:
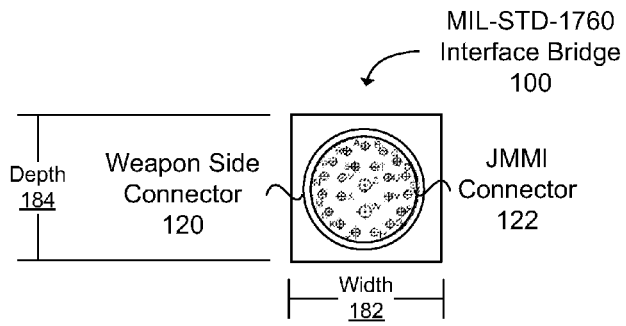
FIG. 3A illustrates a diagram of a side view of a military standard-1760 (MIL-STD-1760) interface bridge form factor in accordance with an example.
Figure 3B:
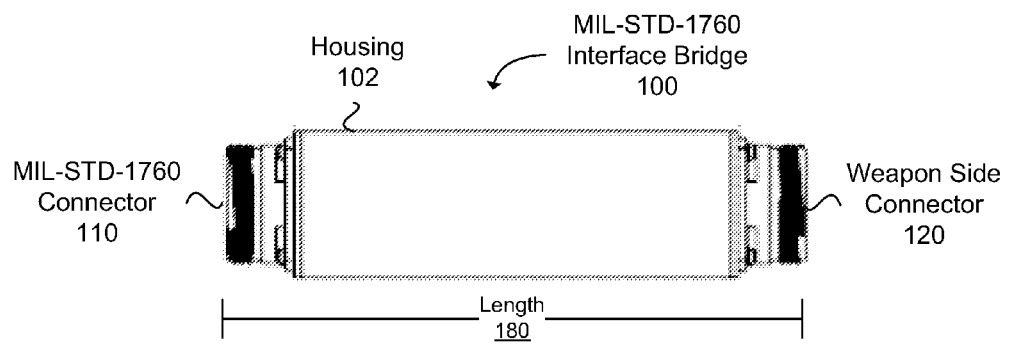
FIG. 3B illustrates a diagram of a side view of a military standard-1760 (MIL-STD-1760) interface bridge form factor in accordance with an example.
Figure 3C:
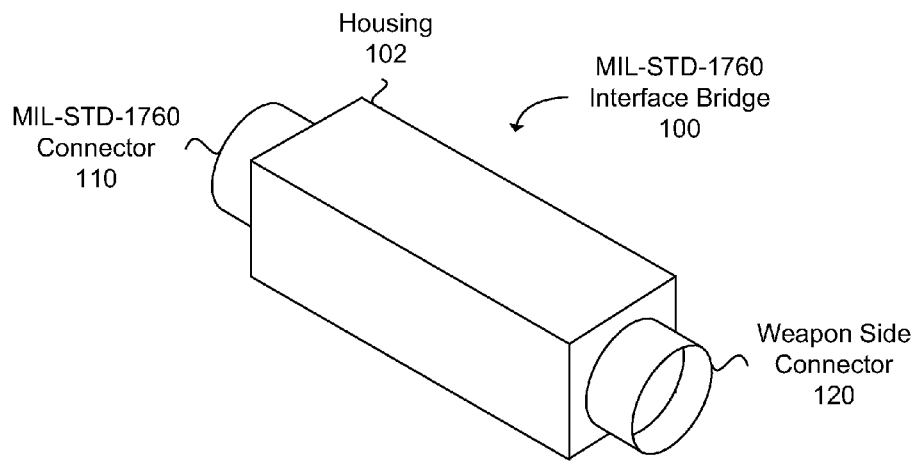
FIG. 3C illustrates a diagram of a profile view of a military standard-1760 (MIL-STD-1760) interface bridge form factor in accordance with an example.

FIGS. 3A-C illustrate an exemplary form factor for the MIL-STD-1760 interface bridge. FIG. 3A illustrates a width 182 and depth 184 of a weapons side connector 120 (e.g., JMMI connector 122). In an example, the width and depth can be less than 3 inches ("). FIG. 3B illustrates a housing 102 for the MIL-STD-1760 interface bridge with a MIL-STD-1760 connector 110 and the weapons side connector 120. In an example, the length 180 can be less than 8". In an example, the MIL-STD-1760 connector can interface with an aircraft bulkhead connector or cable. The weapons side connector can interface to the weapon through an umbilical cable assembly.

FIG. 4 illustrates a table of an interface contact and/or function for the MIL-STD-1760 connector, including a contact (or pin) identifier (ID), contact size, and contact use or function. FIG. 5 illustrates a table and a diagram of an interface contact and/or function for an MMSI receptacle (i.e., weapons side connector), including a contact ID, contact size, contact (CS) use or function, socket type, and sealing plug.

Figure 6:
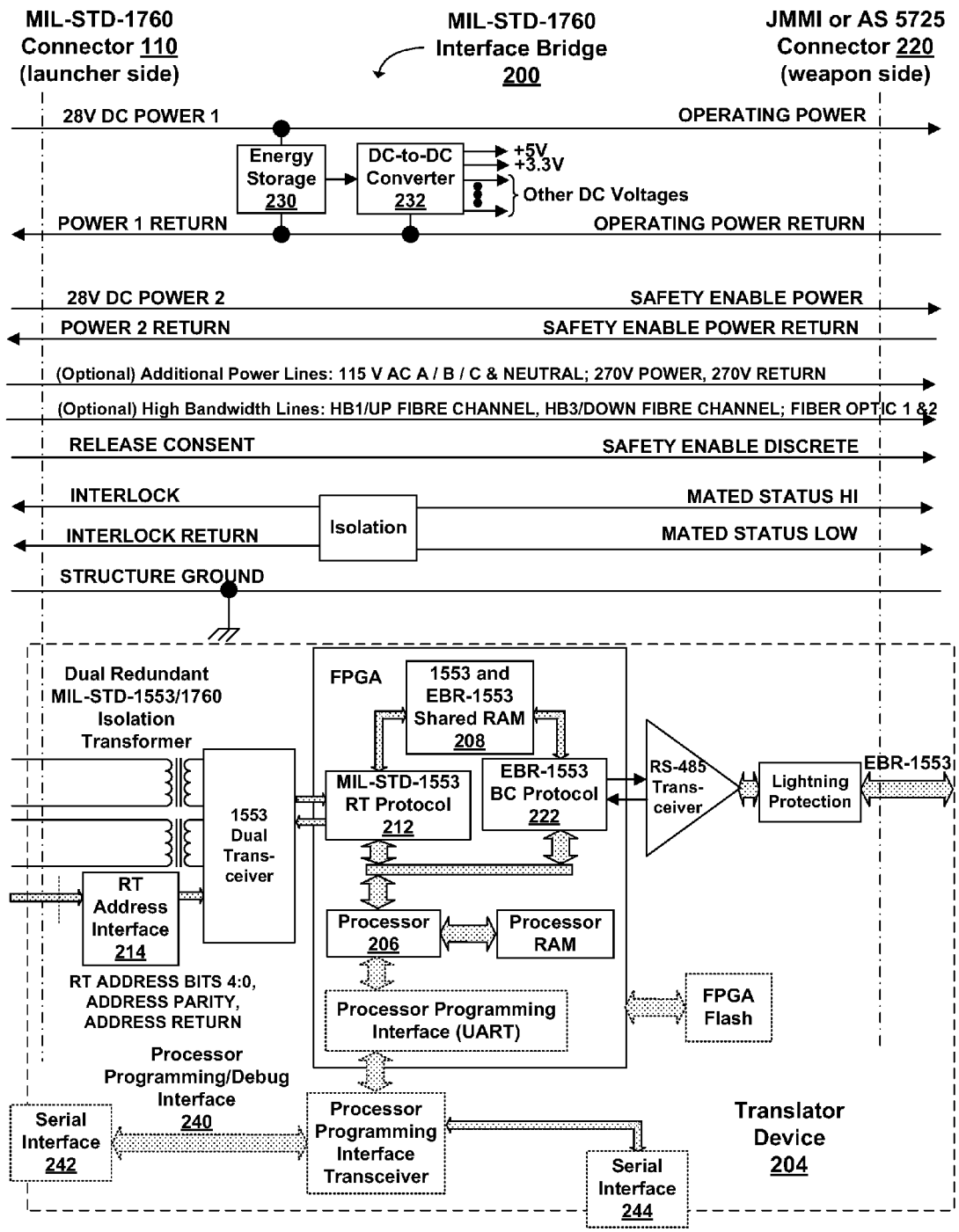
FIG. 6 illustrates a schematic diagram of a military standard-1760 (MIL-STD-1760) interface bridge with a translator device and an energy storage device in accordance with an example.

FIG. 6 illustrates a schematic diagram of the MIL-STD-1760 interface bridge with a MIL-STD-1760 connector 110 on a launcher side and a JMMI or AS-5725 connector 220 on a weapon side. The MIL-STD-1760 interface can include a MIL-STD-1553 interface (e.g., data lines and RT address interface 214), 28 volts direct current (VDC) 1 (VDC1) power, VDC2 power, and a release consent connections. The AS-5725 interface can include an EBR-1553 interface (e.g., data lines) including a RS-485 transceiver, 28 volts (V) operating power, 28V safety enable power, and a safety enable discrete connections.

In an example, the MIL-STD-1760 interface bridge can include a translator device 204. The translator device can use a field-programmable gate array (FPGA). A FPGA is an integrated circuit designed to be configured by a customer or a designer after manufacturing—hence "field-programmable". The FPGA configuration can be generally specified using a hardware description language (HDL), similar to that used for an application-specific integrated circuit (ASIC). The translator device can include a MIL-STD-1553 remote terminal (RT) protocol module 212; an EBR-1553 bus controller (BC) protocol module 222; memory (e.g., random access memory (RAM) 208) shared between the MIL-STD-1553 RT protocol module and the EBR-1553 BC protocol module; an arbitration or access logic (not shown); and a processor 206 (e.g., central processing unit (CPU)) to translate the MIL-STD-1553 RT protocol to the EBR-1553 BC protocol, and translate the EBR-1553 BC protocol to the MIL-STD-1553 RT protocol. The arbitration or access logic can provide a prioritization scheme between the MIL-STD-1553 RT protocol module, EBR-1553 BC protocol module, and the processor to access the memory without dropping messages. The shared memory along with the arbitration or access logic can eliminate the need to perform data copying operations and enable rapid repeating of messages received by the MIL-STD-1553 remote terminal to be re-transmitted by the EBR-1553 bus controller. Similarly, data received by the EBR-1553 BC from RT-to-BC messages from the attached weapon can be stored in RT subaddress buffers, which can enable subsequent re-transmission by the MIL-STD-1553 RT. In operation, BC-to-RT messages received by the MIL-STD-1553 RT can be stored in receive subaddress buffers within the shared RAM. Some of these receive subaddress buffers can also function as data buffers for specific EBR-1553 BC messages. When messages are received by the RT, the processor can be notified by means of interrupts or polling processes. Some of the messages may be immediately transmitted by the EBR-1553 BC, while other messages may be processed internally, and possibly modified prior to transmission by the EBR-1553 BC.

The MIL-STD-1760 interface bridge 200 can use 28VDC1 operating power as a power source, which an energy storage device 230 (e.g., battery and/or capacitors) can use to store power for operation of the translator device during a launch sequence when power can be removed prior to the cessation of communication with the weapon. During a launch sequence of the weapon, the aircraft platform via the MIL-STD-1760 BC can disconnect power to the weapon to ensure the batteries within the weapon provide power to the weapon system before the weapon launch or weapon detachment from the aircraft platform. The MIL-STD-1760 interface bridge can include an isolation transformer (not shown) or an internal power supply (e.g., DC-to-DC converter 232) with an approximately 3.3 volt (V), an approximately 5V, or other DC voltages less than 10 V from a voltage of the MIL-STD-1760 connector. The MIL-STD-1760 interface bridge pass through signals, such as the 28VDC1 which passes through to the 28V operating power, the 28VDC2 which passes through to the 28V safety enable power, and the release consent which passes through safety enable discrete.

In another example, the MIL-STD-1760 interface bridge can include a programming interface 240 to the translator device, a RT address interface 214, an auto-boot initialization module (e.g., FPGA flash memory or erasable programmable read only memory (EPROM)), a serial interface 242 and 244 coupled to the housing and the translator device 204, and a computer readable storage medium (e.g., FPGA flash memory) for preloading of the MIL-STD-1760 interface bridge with data files for transfer to the weapon side connector during operation. The serial interface can be coupled to the MIL-STD-1760 connector 242, the weapons side connector, or another part of the housing 244. The computer readable storage medium can be externally accessible via the serial interface. The programming interface can be used to program and debug the translator device and externally access the translator device. The RT address interface can be used to pull up the voltage of RT address and RT address inputs relative to a RT address return. The auto-boot initialization module can be used to store and load firmware code into the translator device.

With the addition of the energy storage device 230 the MIL-STD-1760 interface bridge can maintain operation of message translation for a short duration of time when power is removed during the launch sequence. Because the addressing schemes are different between MIL-STD-1760 and AS-5725, the MIL-STD-1760 interface bridge can modify the RT address of command words (e.g., selectively modifying message content) with associated recomputation of specific checksums. For instance, the modification of the RT address of a single outbound message (e.g., 'R' message) or a combination of messaging can be used. The MIL-STD-1760 interface bridge can maintain timetagging between interfaces (i.e., MIL-STD-1760 and AS-5725), such as accurate modification of time stamping (e.g., MC-17 message). The MIL-STD-1760 interface bridge can also maintain latency accuracy between interfaces, such as real-time passing or retransmitting messages fast enough to maintain timing. The MIL-STD-1760 interface bridge can meet MIL-STD-1760 system end-to-end (E2E) response time requirements. For example, the MIL-STD-1760 interface bridge can periodically poll 'T' messages at data rates required to meet response timing requirements (e.g., 40 milliseconds (ms)).

Figure 7:
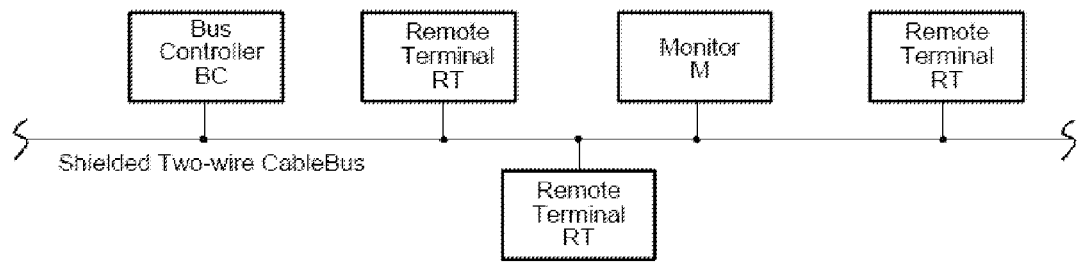
FIG. 7 illustrates a diagram of a military standard-1553 (MIL-STD-1553) bus structure in accordance with an example.
Figure 8:
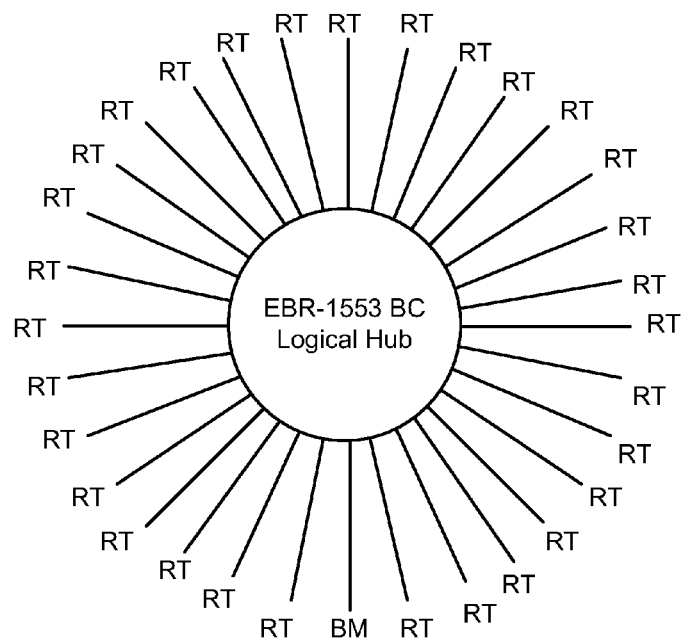
FIG. 8 illustrates a diagram of a star architecture of an enhanced bit rate-1553 (EBR-1553) bus controller (BC) logical hub in accordance with an example.

The MIL-STD-1760 interface bridge can provide a standard MIL-STD-1553 remote terminal 212 and an enhanced bit rate (EBR) 1553 bus controller 222. The MIL-STD-1553 can be a 1 Megabit/sec bus while EBR-1553 can be a 10 Megabits/sec bus. Without translation, the electrical physical layer characteristics of MIL-STD-1553 and EBR-1553 may be incompatible. For instance, the MIL-STD-1553 uses a one-to-many protocol, as illustrated by FIG. 7, while the EBR-1553 is based on recommended standard-485 (RS-485; or American National Standards Institute/Telecommunications Industry Association/Electronic Industries Alliance (ANSI/TIA/EIA)-485) which is a point-to-point protocol, as illustrated by FIG. 8. Therefore, each RT can be coupled to the EBR-1553 bus controller and that RT can have an RT address of zero. FIG. 8 illustrates the star architecture of the EBR-1553, which differs from the bus topology of the MIL-STD-1553B. With EBR-1553, each RT can be independent (e.g., each RT can use an RT address of 0), but the EBR-1553 BC can still communicate with up to 31 RTs. The EBR-1553 BC manages each RT, but the RT may not know of the existence of the other RTs, so each RT has a remote terminal address 0 (or 31 for "broadcast" when a message is sent to all the RTs).

In computer networking and/or wired communication, different functions can be provided by different layers in a protocol stack. The protocol stack can be an implementation of a computer networking protocol suite. The protocol stack (or protocol suite or standard) can include the definition and implementation of the protocols. Each layer or protocol in the protocol stack can provide a specified function. The modularization of the layers and protocols can make design and evaluation of the computer networking and/or wired communication easier. In an example, each protocol module or layer module in a stack of protocols may communicate with at least two other modules (e.g., a higher layer and a lower layer). The lowest protocol or layer (e.g., physical layer) can provide low-level, physical interaction with the hardware. Each higher layer may add more features. The upper or topmost layers (e.g., application layer) can include user applications.

In an example of aircraft-to-weapon system communication, at least three communication layers can be used, including the physical layer, a message layer, and the application layer. The MIL-STD-1760 interface bridge can provide physical layer processing of physical signals between the aircraft platform and a MM weapon platform and message layer processing of messages between the aircraft platform and a MM weapon platform.

Prior to the MIL-STD-1553 data bus (i.e., a serial digital multiplex data bus), aircraft platforms and weapons used inefficient and cumbersome analog point-to-point wire bundles as a means of interconnecting the sensors, computers, actuators, indicators, and other equipment onboard the modern military vehicle. Referring back to FIG. 7, the MIL-STD-1553 multiplex data bus can provide integrated, centralized system control and a standard interface for equipment connected to the bus. The MIL-STD-1553 bus (or interface) provides a means by which bus traffic is available to be accessed with a single connection for testing and interfacing with the system. The MIL-STD-1553 (e.g., "Aircraft Internal Time-Division Command/Response Multiplex Data Bus") with the appropriate revision letter (A or B) as a suffix defines operation of a serial data bus that interconnects multiple devices via a twisted, shielded pair of wires.

A MIL-STD-1553 system can implement a command-response format. Multiplexing provides weight reduction, simplicity, standardization, and flexibility. Multiplexing facilitates the transmission of information along the data flow, and permits the transmission of several signal sources through one communications system.

A MIL-STD-1553 multiplex data bus system can include a bus controller (BC) controlling multiple remote terminals (RT) connected together by a data bus providing a single data path between the bus controller and the associated remote terminals. One or more bus monitors (BM) may be coupled to the MIL-STD-1553 bus, however, bus monitors may not take part in data transfers, and can be used to capture or record data for analysis. In redundant bus implementations, several data buses are used to provide more than one data path (i.e., dual redundant data bus or tri-redundant data bus). Transmissions onto the data bus can be accessible to the BC and connected RTs.

The MIL-STD-1553 bus is made up of twisted-shielded pairs of wires to maintain message integrity with a redundant pair of buses for a second path (or additional paths) for bus traffic in case one of the buses is damaged. Three functional modes of terminals can be used on the data bus: the bus controller, the bus monitor, and the remote terminal. Devices may be capable of more than one function.

The MIL-STD-1553 bus controller (BC) can be a terminal that initiates information transfers on the data bus. The MIL-STD-1553 can send commands to the remote terminals (RT), which can reply with a response. The MIL-STD-1553 bus can support multiple controllers, but only one BC may be active at a time. The control of information transmission on the bus resides with the bus controller. The MIL-STD-1553 bus monitor (BM), which can be used for instrumentation, can be a terminal assigned the task of receiving bus traffic and extracting selected information to be used at a later time. The MIL-STD-1553 remote terminal can be any terminal operating in the remote terminal (RT) mode (e.g., not operating in either the bus controller or bus monitor mode).

Figure 9:
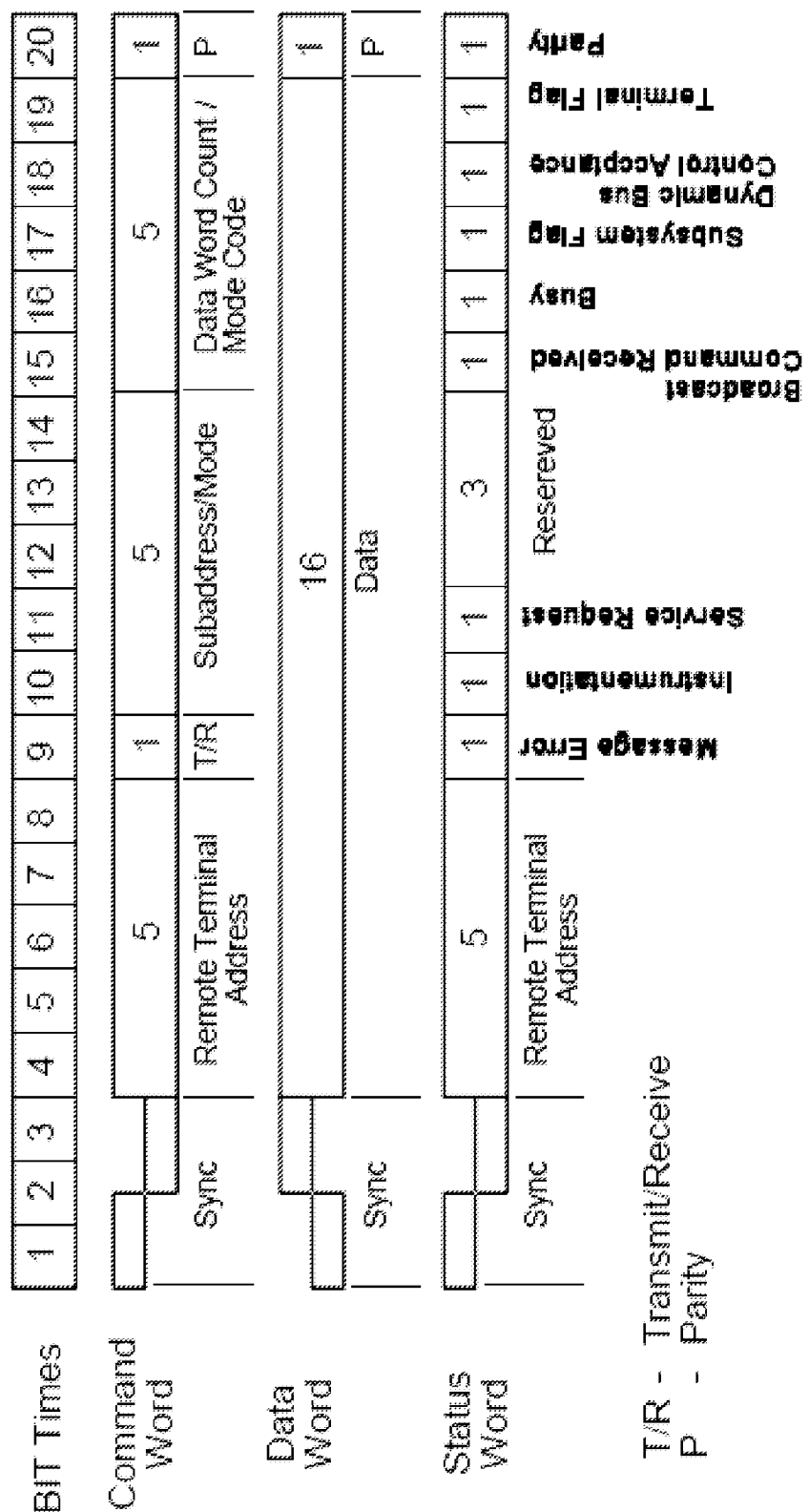
FIG. 9 illustrates a diagram of military standard-1553 (MIL-STD-1553) word formats in accordance with an example.

As illustrated in FIG. 9, messages consist of one or more 16-bit words (e.g., command, data, or status). The 16 bits comprising each word can be transmitted using Manchester code, where each bit is transmitted as a 0.5 µs high and 0.5 µs low for a logical 1 or a low-high sequence for a logical 0. Each word can be preceded by a 3 µs synchronization (sync) pulse (i.e., 1.5 µs low plus 1.5 µs high for data words and the opposite for command and status words, which cannot occur in the Manchester code) and followed by an odd parity bit. Practically each word can be considered as a 20-bit word: 3 bit for sync, 16 bit for payload and 1 bit for odd parity control. The words within a message can transmitted contiguously and a minimum of a 4 microsecond (µs) gap can occur between messages. However, an inter-message gap can be much larger than 4 µs, even up to 1 ms with some older bus controllers. Devices (e.g., RTs) can start transmitting their response to a valid command within 4-12 µs and may be considered to not have received a command or message if no response has started within 14 µs.

The nominal word size is 16 bits, with the most significant bit (MSB) first. The three types or formats of MIL-STD-1553 words include a command word, a status word, and a data word, as illustrated by FIG. 9. A packet is defined to have no inter-message gaps. The time between the last word of a controller message and the return (i.e., reply) of the terminal status byte is 4-12 microseconds. The time between status byte and a next bus controller message may be undefined.

Command words are transmitted by the bus controller and include a 3 bit-time sync pattern (i.e., bits 1-3), a 5 bit RT address field (i.e., bits 4-8; RT address 0-31), a 1 transmit/receive (T/R) field (i.e., bit 9; 0 for receive or 1 for transmit), a 5 bit subaddress/mode field (i.e., bits 10-14; indicate the location (sub-address) to hold or get data on the RT (1-30); sub-addresses 0 and 31 are reserved for mode codes), a 5 bit word count/mode code field (i.e., bits 15-19; indicate the number of words to expect (1-32); all zero bits indicate 32 words), and a 1 parity check bit (i.e., bit 20). In the case of a mode code, these bits indicate the mode code number (e.g., initiate self-test and transmit BIT word).

Data words can be transmitted either by the BC or by the RT in response to a BC request. MIL-STD-1553 allows a maximum of 32 data words to be sent in a packet with a command word before a status response is returned. Data words can include a 3 bit-time sync pattern (i.e., bits 1-3; opposite in polarity from command and status words), a 16 bit data field (i.e., bits 4-20), and 1 parity check bit (i.e., bit 20). The status words can be transmitted by the RT in response to command messages from the BC and include a 3 bit-time sync pattern (i.e., a similar pattern as for a command word), a 5 bit address of the responding RT (i.e., bits 4-8; RT address 0-31), a 11 bit status field to notify the BC of the operating condition of the RT and subsystem (i.e., bits 9-19; single bit condition codes, where 'one' state indicates a condition is true; more than one condition may be true at the same time), and 1 parity check bit (i.e., bit 20).

Communication on the MIL-STD-1553 bus can be under the control of the bus controller using commands from the BC to the RTs to receive or transmit. The sequence of words, (the form of the notation can be <originator>.<word_type (destination)> and is a notation similar to communicating sequential processes (CSP)), for transfer of data from the BC (e.g., master) to a terminal (e.g., RT) can be represented by: master.command(terminal)→terminal.status(master)→master.data(terminal)→master.command(terminal)→terminal.status(master)

Thus, during a transfer, communication is started by the bus controller, and a remote terminal device may not initiate a data transfer. The status word at the end of a data transfer sequence ensures that the data has been received and that the result of the data transfer is acceptable. If either RT fails to send its status or the expected data or indicates a problem through the setting of error bits in the status word, the bus controller may retry the transmission. Thus the MIL-STD-1553 sequence of words provides high integrity communication.

The MIL-STD-1553 bus controller can have a schedule of transfers (referred to as cyclic executive schedule structure) that covers the majority of transfers, often organized into a major frame or major cycle, which can be subdivided into minor cycles. While the RTs may not start a transfer directly, the MIL-STD-1553 does provide processes (e.g., acyclic transfers as they are outside the structure used by the cyclic executive) for when an RT needs to transmit data that is not automatically scheduled by the bus controller. Due to acyclic transfers, the bus controller can poll the remote terminals connected to the data bus, generally at least once in a major cycle. RTs with higher-priority functions (for example, RTs operating the aircraft control surfaces) can be polled more frequently, while lower-priority functions may be polled less frequently.

Six types of MIL-STD-1553 transactions can be allowed between the BC and a specific RT or between the bus controller and a pair of RTs. The six types of MIL-STD-1553 transactions can include a controller to RT transfer, a RT to controller transfer, RT to RT transfers, a mode command without a data word, a transmit mode command with data word(s), or a receive mode command with data word(s). In the controller to RT transfer, the bus controller sends one 16-bit receive command word, immediately followed by 1 to 32 16-bit data words. The selected remote terminal can then send a single 16-bit status word. In the RT to controller transfer, the bus controller sends one transmit command word to a remote terminal. The remote terminal then sends a single status word, immediately followed by 1 to 32 words. In the RT to RT transfers, the bus controller sends out one receive command word immediately followed by one transmit command word. The transmitting remote terminal sends a status word immediately followed by 1 to 32 data words. The receiving terminal then sends its status word. In the mode command without a data word, the bus controller sends one command word with a subaddress of 0 or 31 signifying a mode code type command. The remote terminal responds with a status word. In the transmit mode command with data word(s), the bus controller sends one command word with a subaddress of 0 or 31 signifying a mode code type command. The remote terminal responds with a status word immediately followed by a data word. In a receive mode command with data word(s), the bus controller sends one command word with a subaddress of 0 or 31 signifying a mode code type command immediately followed by a data word. The remote terminal responds with a status word. MIL-STD-1553B also allows for additional optional broadcast transfers, such as the controller to RT(s) transfer, the RT to RT(s) transfers, the broadcast type mode command without a data word, and the broadcast type mode command with data word(s).

Figure 10:
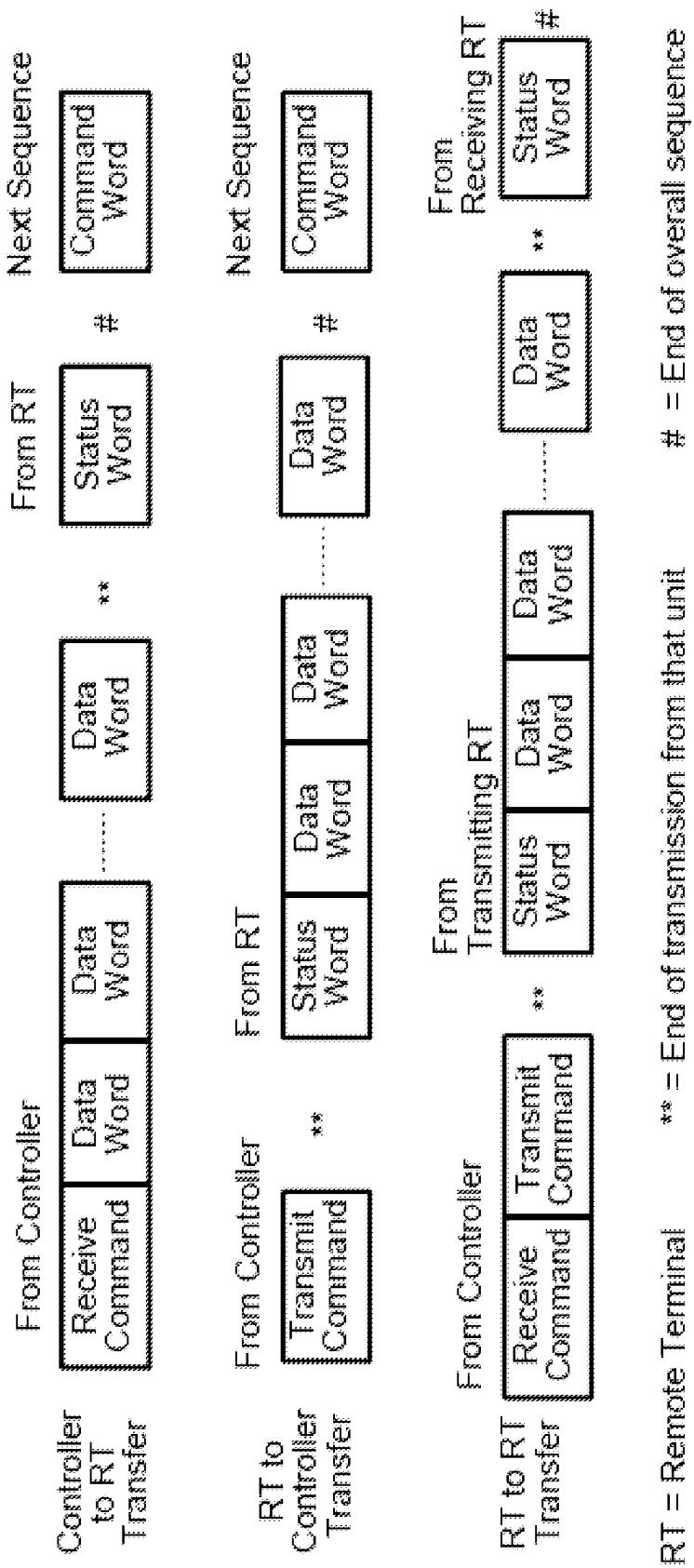
FIG. 10 illustrates a diagram of military standard-1553 (MIL-STD-1553) data message formats in accordance with an example.

FIG. 10 illustrates the basic formats of three basic types of MIL-STD-1553 information transfers including bus controller to remote terminal transfers (BC-to-RT), remote terminal to bus controller transfers (RT-to-BC), and remote terminal to remote terminal (RT-to-RT) transfers. The RT-to-RT transfer may not apply to MIL-STD-1760 weapon systems. The MIL-STD-1553 information transfers can be related to the data flow and can be referred to as messages. In an example, receive ('R') messages can refer to BC-to-RT messages, and transmit ('T') messages can refer to RT-to-BC messages.

The MIL-STD-1760 interface bridge can include a MIL-STD-1553 remote terminal (RT) and an EBR-1553 bus controller. In an example, at the MIL-STD-1553 RT, the MIL-STD-1760 interface bridge can pass through 'R' messages received from aircraft to the EBR 1553 bus controller for pass through transmission to the weapon with some modifications. For example, for an 11 R message, the translator can set the RT address field to zero (i.e., weapon address using EBR 1553) and recompute the 'R' message checksum prior to transmission. In another example, for the mode code 17 (i.e., synch with data or time tagging) message, the MIL-STD-1760 interface bridge can update the data word to reflect the propagation delay through the device. For instance, the MIL-STD-1760 interface bridge can update 'T' message buffers from 'T' messages received at EBR-1553 BC.

In another example, at the EBR-1553 bus controller, the MIL-STD-1760 interface bridge can transmits the 'R' messages received at the MIL-STD-1553 RT. In addition, the MIL-STD-1760 interface bridge can continuously poll the 'T' messages and update the 'T' message buffers at the RT device.

Figure 11:
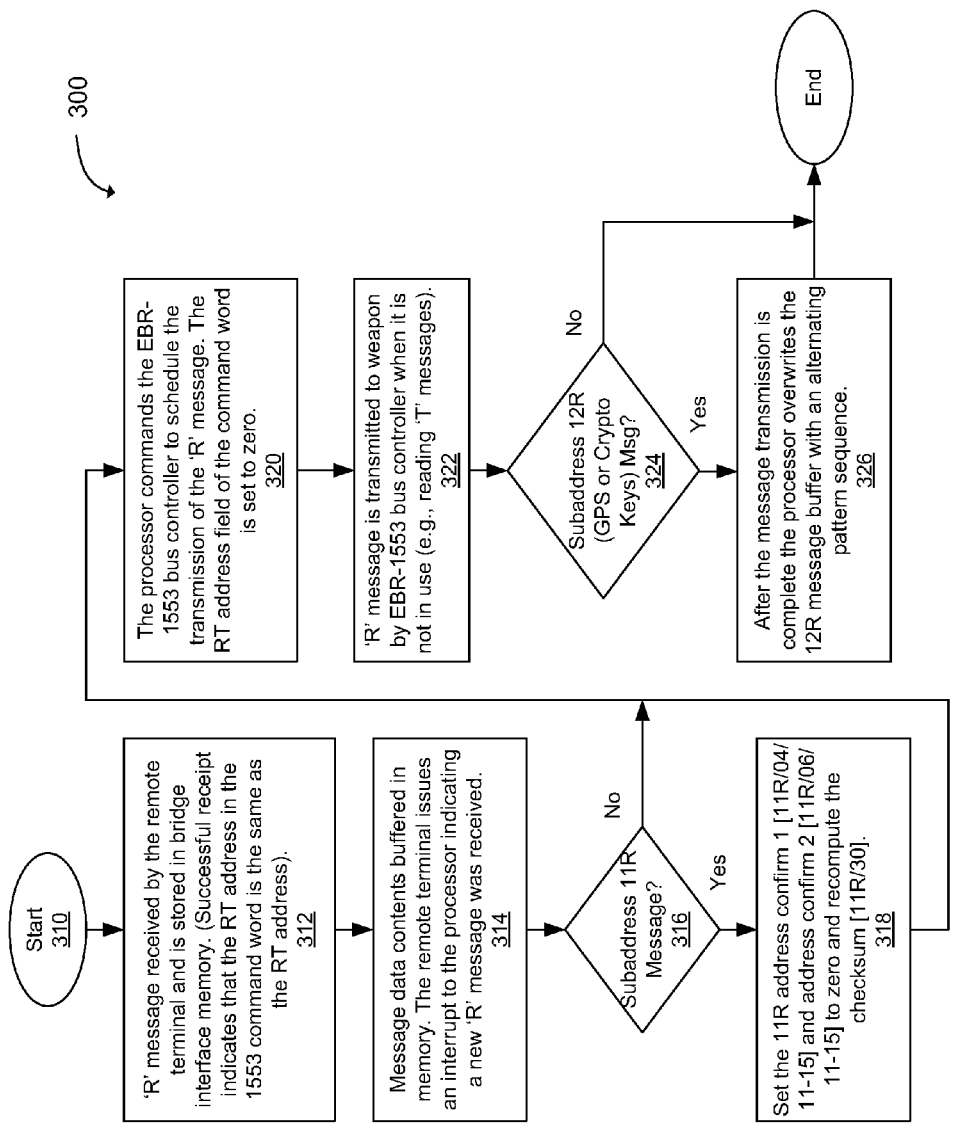
FIG. 11 illustrates a flow chart of a receive message ('R' message) process in accordance with an example.

FIGS. 11-15 illustrate message flows and translation using the MIL-STD-1760 interface bridge. FIG. 11 illustrates a receive ('R') message process flow 300. The flow can start 310 with an 'R' message being received by the MIL-STD-1760 or MIL-STD-1553 remote terminal and stored in bridge interface memory 312. Successful receipt of the 'R' message can be indicated when the RT address in the 1553 command word is the same as the RT address. Then, the message data contents can be buffered in memory, and the remote terminal can issue an interrupt to the processor indicating a new 'R' message was received 314. A determination can be made if the message is a subaddress 11R message 316. If the message is a subaddress 11R message, the 11R address confirm 1 [11R/04/11-15] and address confirm 2 [11R/06/11-15] can be set to zero and the checksum [11R/30] can be recomputed. The processor can command the EBR-1553 bus controller to schedule the transmission of the 'R' message, and the RT address field of the command word can be set to zero 320. The 'R' message can be transmitted to the weapon by EBR-1553 bus controller when the EBR-1553 BC is not in use (e.g., reading 'T' messages) 322. A determination can be made if the message is a subaddress 12R message 324. If the message is a subaddress 12 R message (e.g., include GPS or crypto key information), after the message transmission is complete the processor can overwrite the 12R message buffer with an alternating pattern sequence.

Figure 12:
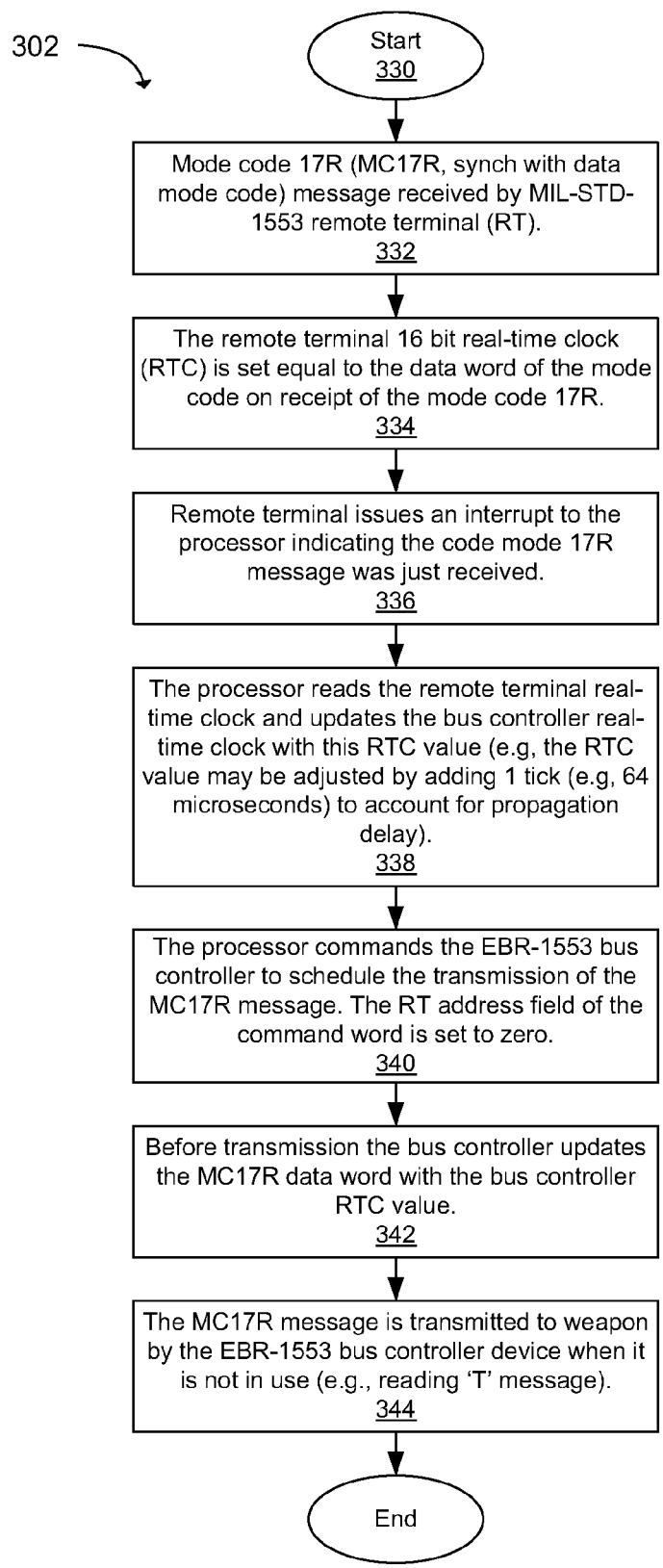
FIG. 12 illustrates a flow chart of a mode code 17R message process in accordance with an example.

FIG. 12 illustrates a mode code 17R message process flow 302. The flow can start 330 with a mode code 17R (MC17R, synch with data mode code) message received by the MIL-STD-1553 (or MIL-STD-1760) remote terminal (RT) 332. The remote terminal 16 bit real-time clock (RTC) can be set equal to the data word of the mode code on receipt of the mode code 17R 334. The remote terminal can issue an interrupt to the processor indicating the code mode 17R message was just received 336. The processor can read the remote terminal real-time clock and update the bus controller real-time clock with this RTC value (e.g., the RTC value may be adjusted by adding 1 tick (e.g., 64 microseconds) to account for propagation delay) 338. The processor can command the EBR-1553 bus controller to schedule the transmission of the MC17R message, and the RT address field of the command word can be set to zero 340. Before transmission the bus controller can update the MC17R data word with the bus controller RTC value 342. The MC17R (or MC-17) message can be transmitted to the weapon by the EBR-1553 bus controller device when the EBR-1553 BC is not in use (e.g., reading 'T' message) 344.

Figure 13:
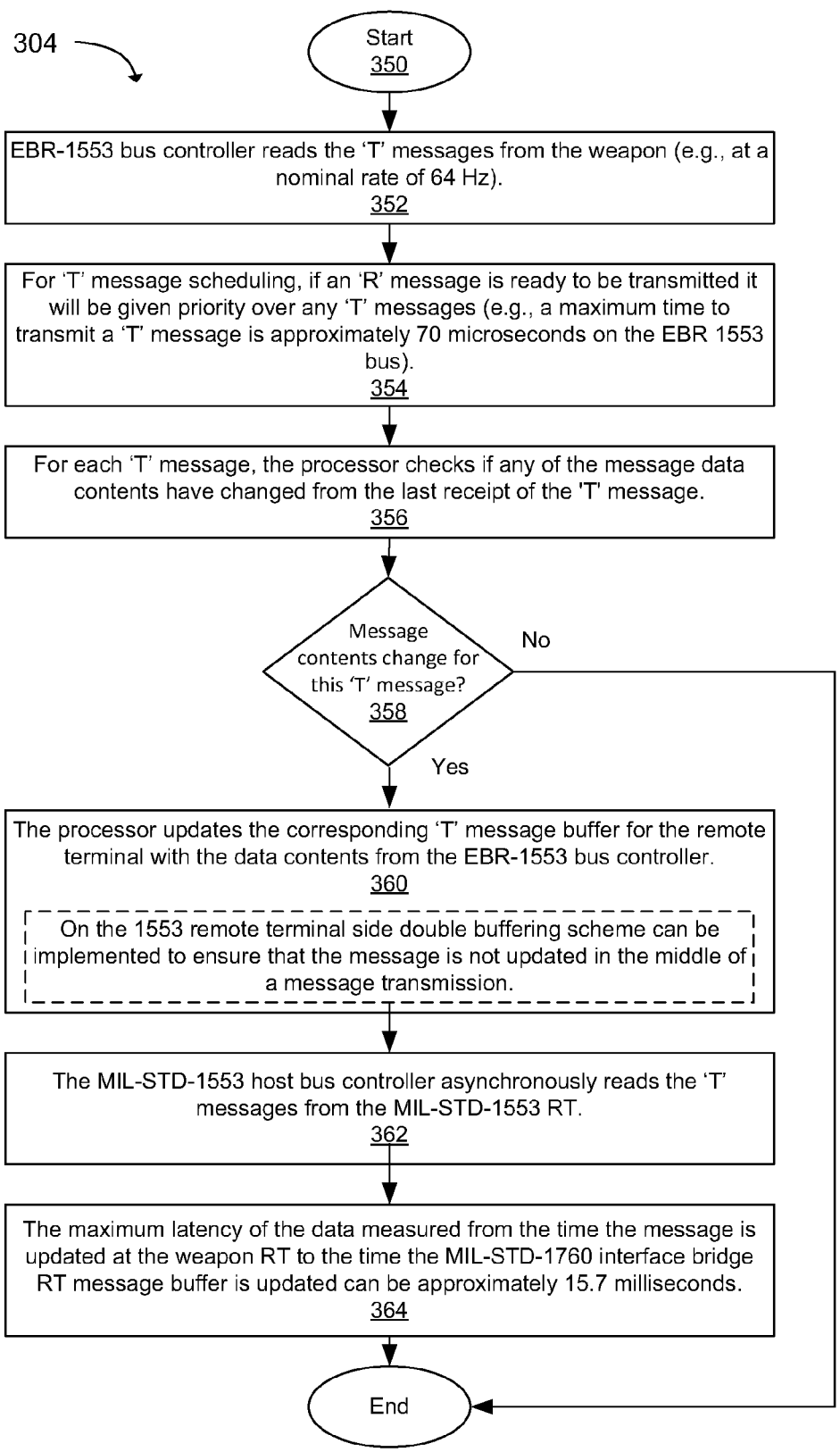
FIG. 13 illustrates a flow chart of a transmit message ('T' message) process in accordance with an example.

FIG. 13 illustrates a transmit ('T') message process flow 304. The flow can start 350 with an EBR-1553 bus controller reading the 'T' messages from the weapon (e.g., at a nominal rate of 64 Hz) 352. For 'T' message scheduling, if an 'R' message is ready to be transmitted the 'R' message may be given priority over any 'T' messages (e.g., a maximum time to transmit a 'T' message can be approximately 70 microseconds on the EBR-1553 bus) 354. For each 'T' message, the processor can check if any of the message data contents have changed from the last receipt of the 'T' message 356. A determination can be made if the message contents change for this 'T' message 358. If the message contents have not changed then no further action may be performed. If the message contents have changed, the processor can update the corresponding 'T' message buffer for the remote terminal with the data contents from the EBR-1553 bus controller 360. On the MIL-STD-1553 remote terminal side double buffering scheme can be implemented to ensure that the message is not updated in the middle of a message transmission. The MIL-STD-1553 host bus controller can asynchronously read the 'T' messages from the MIL-STD-1553

RT 362. In an example, the maximum latency of the data measured from the time the message can be updated at the weapon RT to the time the MIL-STD-1760 interface bridge RT message buffer is updated can be approximately 15.7 milliseconds (ms) 364.

Figure 14:
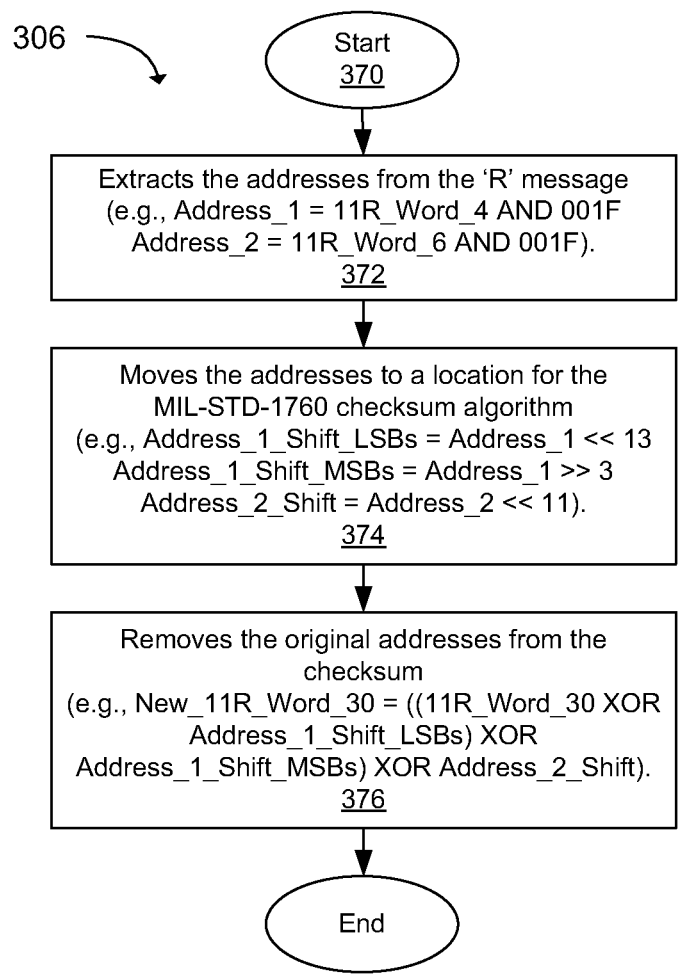
FIG. 14 illustrates a flow chart of an 11R message checksum update process in accordance with an example.

FIG. 14 illustrates an 11R message checksum update process flow 306. The flow can start 370 with an extracting the addresses from the 'R' message (e.g., Address_1=11R_Word_4 AND 001F and Address_2=11R_Word_6 AND 001F) 372. Then the addresses can be moved to a location for the MIL-STD-1760 checksum algorithm (e.g., Address_1_Shift_LSBs=Address_1<<13, Address_1_Shift_MSBs=Address_1>>3, and Address_2_Shift=Address_2<<11) 374. The original addresses can be removed from the checksum (e.g., New_11R_Word_30=((11R_Word_30 XOR Address_1_Shift_LSBs) XOR Address_1_Shift_MSBs) XOR Address_2_Shift) 376.

Figure 15:
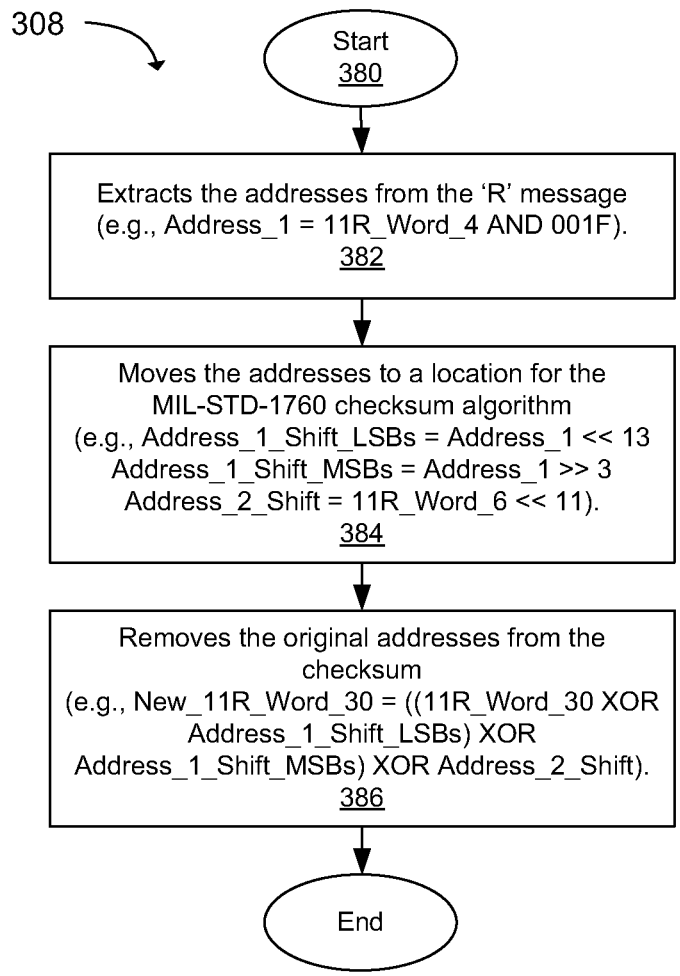
FIG. 15 illustrates a flow chart of a checksum conversion process in accordance with an example.

FIG. 15 illustrates another checksum conversion process flow 308. The flow can start 380 with extracting the addresses from the 'R' message (e.g., Address_1=11R_Word_4 AND 001F) 382. Then the addresses can be moved to a location for the MIL-STD-1760 checksum algorithm (e.g., Address_1_Shift_LSBs=Address_1<<13, Address_1_Shift_MSBs=Address_1>>3, and Address_2_Shift=11R_Word_6<<11) 384. The original addresses can be removed from the checksum (e.g., New_11R_Word_30=((11R_Word_30 XOR Address_1_Shift_LSBs) XOR Address_1_Shift_MSBs) XOR Address_2_Shift) 386.

Referring back to FIGS. 3A-C and 6, a military standard-1760 (MIL-STD-1760) interface bridge 100 can include a housing 102, a translator device 204, and an energy storage device 230. The housing can include a MIL-STD-1760 connector 110 on a first end and a weapon side connector 120 on a second end. The translator device can translate a MIL-STD-1553 remote terminal (RT) protocol to a weapon side signaling protocol and translate the weapon side signaling protocol to the MIL-STD-1553 RT protocol. The energy storage device can be coupled to the operating power of the MIL-STD-1760 connector and can be configured to provide power to the translator device for a duration (e.g., 500 ms) after the power from the MIL-STD-1760 connector is disconnected.

In an example, the weapon side connector uses an aircraft store-5725 (AS-5725) connector (or joint miniature munitions interface (JMMI) connector 122 or miniature munitions store interface (MMSI) connector) and the weapon side signaling protocol uses an Enhanced Bit Rate-1553 (EBR-1553) bus controller (BC) protocol.

In another example, the translator device 204 includes a MIL-STD-1553 RT protocol module 212, an EBR-1553 BC protocol module 222, and a processor 206. The MIL-STD-1553 RT protocol module can buffer at least a portion of the signaling from the MIL-STD-1760 connector or control at least a portion of the signaling to the MIL-STD-1760 connector. The EBR-1553 BC protocol module can buffer at least a portion of the signaling from the AS-5725 connector or control at least a portion of the signaling to the AS-5725 connector. The processor can translate the MIL-STD-1553 RT protocol to the EBR-1553 BC protocol, and translate the EBR-1553 BC protocol to the MIL-STD-1553 RT protocol.

In another configuration, the translator device can include memory (e.g., RAM 208) and an arbitration or access logic (not shown). The memory can be shared between the MIL-STD-1553 RT protocol module and the EBR-1553 BC protocol module. The arbitration logic or access logic can provide a prioritization scheme between the MIL-STD-1553 RT protocol module, EBR-1553 BC protocol module, and the processor to access the memory without dropping messages. In an example, the translator device can update an RT address field of a BC command word with an RT address equal to zero. The translator device can selectively modify message content of a message and recalculate a checksum for the message before the message is retransmitted by a weapon side BC using the EBR-1553 BC protocol.

In another example, the translator device can include an isolation transformer and an internal power supply (e.g., DC-to-DC converter 232), a programming interface 240, a RT address interface 214, or an auto-boot initialization module. The isolation transformer and the internal power supply can provide the translator device with an approximately 3.3 volt (V), an approximately 5V, or a voltage less than 10 V from a voltage of the MIL-STD-1760 connector. The programming interface to the translator device to program and debug the translator device and externally access the translator device. The RT address interface to pull up the voltage of RT address and RT address inputs relative to a RT address return. The auto-boot initialization module to store and load firmware code into the translator device.

In another configuration, the translator device can include a serial interface 242 or 244 (e.g., RS-232 or RS-422) coupled to the housing and the translator device, and a computer readable storage medium (e.g., FPGA flash) for preloading of the MIL-STD-1760 interface bridge with data files for transfer to the weapon side connector during operation. The computer readable storage medium can be externally accessible via the serial interface.

In an example, at least a portion of the signaling from the MIL-STD-1760 connector passes through to the weapon side connector or at least a portion of the signaling from the weapon side connector passes through to the MIL-STD-1760 connector. The energy storage device can include a battery or capacitor. The energy storage device can provide power to the translator device for at least 500 milliseconds (ms) after power from the MIL-STD-1760 connector is disconnected. The translator device can provide periodic polling of transmit messages ('T' messages) generated via the weapon side signaling protocol to maintain a system end-to-end response time requirement of less than 40 milliseconds (ms). In another example, the translator device can modify a time stamping of a specified mode control (MC) messages, or maintain a timing requirement of a specified receive message ('R' message) generated via the MIL-STD-1553 RT protocol.

Figure 16:
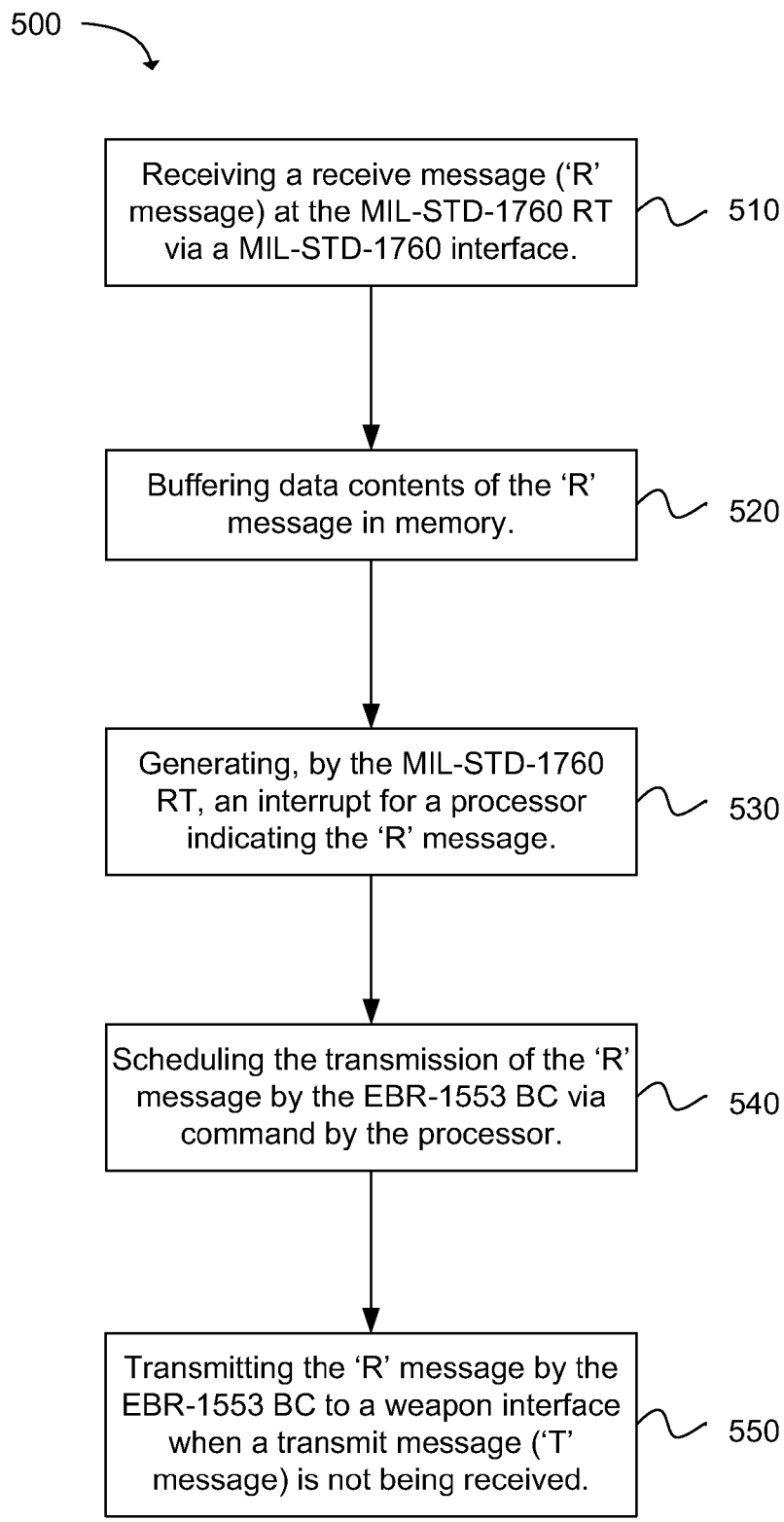
FIG. 16 depicts a flow chart of a method for communicating from a military standard-1760 (MIL-STD-1760) remote terminal (RT) to an enhanced bit rate-1553 (EBR-1553) bus controller (BC) in accordance with an example.

Another example provides a method 500 for communicating from a military standard-1760 (MIL-STD-1760) remote terminal (RT) to an enhanced bit rate-1553 (EBR-1553) bus controller (BC), as shown in the flow chart in FIG. 16. The method may be executed as instructions on a machine, computer circuitry, or a processor, where the instructions are included on at least one computer readable medium or one non-transitory machine readable storage medium. The method includes the operation of receiving a receive message ('R' message) at the MIL-STD-1760 RT via a MIL-STD-1760 interface, as in block 510. The operation of buffering data contents of the 'R' message in memory follows, as in block 520. The next operation of the method can be generating, by the MIL-STD-1760 RT, an interrupt for a processor indicating the 'R' message, as in block 530. The operation of scheduling the transmission of the 'R' message by the EBR-1553 BC via command by the processor follows, as in block 540. The method can further include transmitting the 'R' message by the EBR-1553 BC to a weapon interface when a transmit message ('T' message) is not being received, as in block 550.

In an example, the weapon interface provides signaling for a EBR-1553 RT and the weapon interface includes an aircraft store-5725 (AS-5725) interface, a joint miniature munitions interface (JMMI), or miniature munitions store interface (MMSI). In another example, after receiving the 'R' message, the method can further include setting a RT address field to zero for a subaddress 11R message, and recomputing checksum for the subaddress 11R message. In another configuration, after receiving the 'R' message, the method can further include overwriting the data contents in memory with an alternating pattern sequence for a subaddress 12R message. The 12R message can include global positioning system (GPS) cryptography keys.

In another example, the method can further include: setting a RT real time clock of the MIL-STD-1760 RT equal to a data word of a mode code-17R (MC-17R) command word to synchronize the real time clock with the data mode code; interrupting the processor; reading the RT real time clock; updating a BC real time clock with the value of the RT real time clock; and transmitting the MC-17R command word with a value of the BC real time clock by the EBR-1553 BC to a weapon interface when a transmit message ('T' message) is not being received.

Figure 17:
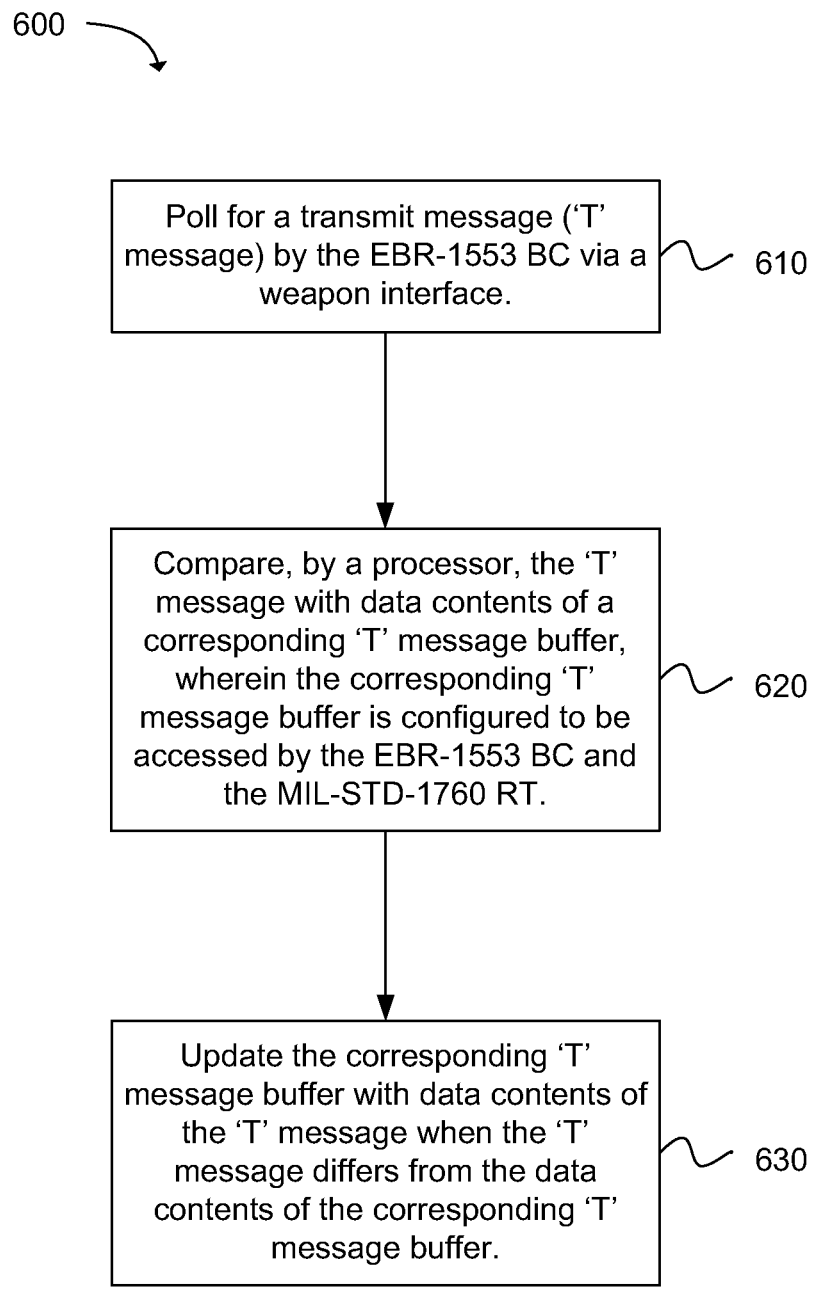
FIG. 17 depicts functionality of computer circuitry of an enhanced bit rate-1553 (EBR-1553) bus controller (BC) for communicating with a weapon EBR-1553 remote terminal (RT) in accordance with an example.

Another example provides functionality 600 of computer circuitry of an enhanced bit rate-1553 (EBR-1553) bus controller (BC) for communicating with a weapon EBR-1553 remote terminal (RT), as shown in the flow chart in FIG. 17. The functionality may be implemented as a method or the functionality may be executed as instructions on a machine, where the instructions are included on at least one computer readable medium or one non-transitory machine readable storage medium. The computer circuitry can be configured to poll for a transmit message ('T' message) by the EBR-1553 BC via a weapon interface, as in block 610. The computer circuitry can be further configured to compare, by a processor, the 'T' message with data contents of a corresponding 'T' message buffer, wherein the corresponding 'T' message buffer is configured to be accessed by the EBR-1553 BC and the MIL-STD-1760 RT, as in block 620. The computer circuitry can also be configured to update the corresponding 'T' message buffer with data contents of the 'T' message when the 'T' message differs from the data contents of the corresponding 'T' message buffer, as in block 630.

In an example, the computer circuitry can be further configured to: asynchronously read the corresponding 'T' message buffer by the MIL-STD-1760 RT; and transmit the 'T' message based on the corresponding 'T' message buffer from the MIL-STD-1760 RT to a MIL-STD-1760 interface. The 'T' message can be configured to be transmitted within 70 microseconds (μs). The computer circuitry configured to update the corresponding 'T' message buffer with the data contents of the 'T' message can be further configured to double buffer the 'T' message to ensure that an updated 'T' message based on the corresponding 'T' message buffer is not updated in a middle of a message transmission.

Various techniques, or certain aspects or portions thereof, may take the form of program code (i.e., instructions) embodied in tangible media, such as floppy diskettes, compact disc-read-only memory (CD-ROMs), digital versatile disc (DVD), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The interface bridge device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" or "configuration" means that a particular feature, structure, or characteristic described in connection with the example is included in at least one embodiment of the present invention. Thus, appearances of the phrases "in an example" or "in a configuration" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A military standard-1760 (MIL-STD-1760) interface bridge comprising:
   a housing including an aircraft platform side MIL-STD-1760 connector on a first end and a weapon side connector on a second end;
   a translator device to translate a MIL-STD-1553 remote terminal (RT) protocol to a weapon side signaling protocol and translate the weapon side signaling protocol to the MIL-STD-1553 RT protocol, wherein the weapon side connector uses an aircraft store-5725 (AS-5725) connector and the weapon side signaling protocol uses an Enhanced Bit Rate-1553 (EBR-1553) bus controller (BC) protocol; and
   an energy storage device coupled to operating power of the MIL-STD-1760connector that provides power to the translator device for a duration after power to the MIL-STD-1760 connector is removed, wherein the translator device is operable to receive power from an aircraft platform through the MIL-STD-1760 connector prior to a launch sequence, and wherein the power from the aircraft platform is transferrable through the interface bridge to the aircraft store 5725 connector.

2. The MIL-STD-1760 interface bridge of claim 1, wherein the translator device further comprises:
   a MIL-STD-1553 RT protocol module to buffer at least a portion of the signaling from the MIL-STD-1760 connector or control at least a portion of the signaling to the MIL-STD-1760 connector;
   an EBR-1553 BC protocol module to buffer at least a portion of the signaling from the AS-5725 connector or control at least a portion of the signaling to the AS-5725connector; and
   a processor to translate the MIL-STD-1553 RT protocol to the EBR-1553 BC protocol, and translate the EBR-1553 BC protocol to the MIL-STD-1553 RT protocol.

3. The MIL-STD-1760 interface bridge of claim 2, wherein the translator device further comprises:
   memory shared between the MIL-STD-1553 RT protocol module and the EBR-1553 BC protocol module; and
   an arbitration or access logic to provide a prioritization scheme between the MIL-STD-1553 RT protocol module, EBR-1553 BC protocol module, and the processor to access the memory without dropping messages.

4. The MIL-STD-1760 interface bridge of claim 1, wherein the translator device updates an RT address field of a BC command word with an RT address equal to zero.

5. The MIL-STD-1760 interface bridge of claim 1, wherein the translator device selectively modifies message content of a message and recalculates a checksum for the message before the message is retransmitted by a weapon side BC using the EBR-1553 BC protocol.

6. The MIL-STD-1760 interface bridge of claim 1, further comprising:
   an isolation transformer and an internal power supply with an approximately 3.3 volt (V), an approximately 5V, or a voltage less than 10 V from a voltage of the MIL-STD-1760 connector;
   a programming interface to the translator device to program and debug the translator device and externally access the translator device;
   a RT address interface to pull up the voltage of RT address and RT address inputs relative to a RT address return; or
   an auto-boot initialization module to store and load firmware code into the translator device.

7. The MIL-STD-1760 interface bridge of claim 1, further comprising:
   a serial interface coupled to the housing and the translator device; and
   a computer readable storage medium for preloading of the MIL-STD-1760 interface bridge with data files for transfer to the weapon side connector during operation, wherein the computer readable storage medium is externally accessible via the serial interface.

8. The MIL-STD-1760 interface bridge of claim 1, wherein at least a portion of the signaling from the MIL-STD-1760 connector passes through to the weapon side connector or at least a portion of the signaling from the weapon side connector passes through to the MIL-STD-1760 connector.

9. The MIL-STD-1760 interface bridge of claim 1, wherein the energy storage device includes a battery or capacitor and provides power to the translator device for at least 500 milliseconds (ms) after power is removed from the MIL-STD-1760 connector.

10. The MIL-STD-1760 interface bridge of claim 1, wherein translator device provides periodic polling of transmit messages ('T' messages) generated via the weapon side signaling protocol to maintain a system end-to-end response time requirement of less than 40 milliseconds (ms).

11. The MIL-STD-1760 interface bridge of claim 1, wherein translator device:
modifies a time stamping of a specified mode control (MC) messages; or
maintains a timing requirement of a specified receive message ('R' message) generated via the MIL-STD-1553 RT protocol.

\* \* \* \* \*